Dec. 2, 1924.
B. J. GIESE
JACKETED CAN
Filed Sept. 8, 1922
1,517,978
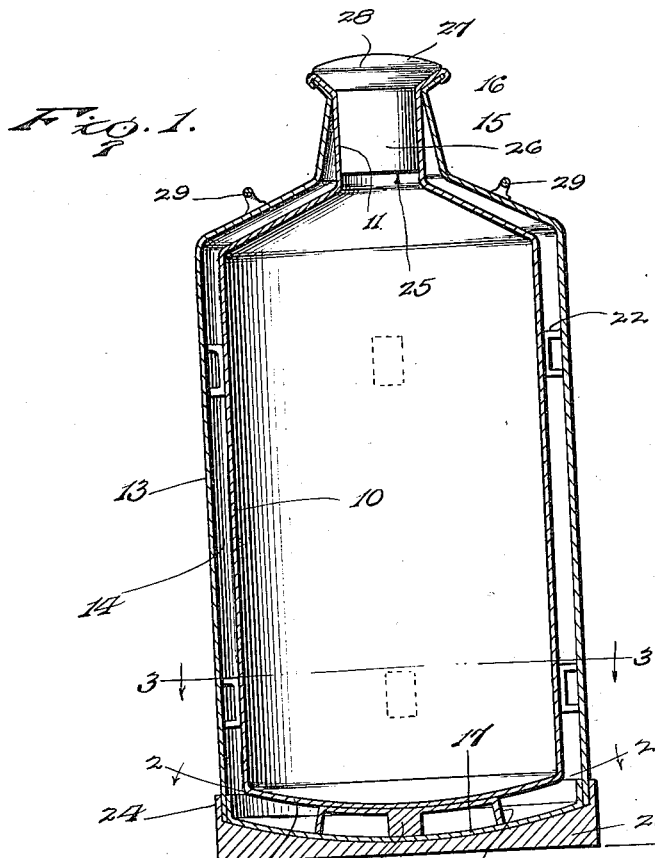

Patented Dec. 2, 1924.

1,517,978

UNITED STATES PATENT OFFICE.

BARNEY J. GIESE, OF OCONTO, WISCONSIN.

JACKETED CAN.

Application filed September 8, 1922. Serial No. 586,927.

*To all whom it may concern:*

Be it known that I, BARNEY J. GIESE, citizen of the United States, residing at Oconto, in the county of Oconto and State of Wisconsin, have invented certain new and useful Improvement in Jacketed Cans, of which the following is a specification.

My invention relates to a receptacle for liquids such as cream and milk and the main object of the invention is to provide a vessel of this kind that is strongly built to be suitable for transportation and which at the same time is leak-proof and adapted to retain the contents at a uniform temperature.

With this object in view I construct my can with double walls providing a space between them for air, this space being sealed to prevent the escape of the locked up air.

In the accompanying drawing one embodiment of the invention is illustrated, and

Fig. 1 represents a vertical section of a can;

Fig. 2 a horizontal section along line 2—2 of Fig. 1, and

Fig. 3 a similar section along line 3—3 of the same figure.

The receptacle consists of an inner, preferably bottle shaped, vessel 10 having a narrow neck 11 at its upper end. The bottom 12 of this vessel is preferably convex to give sufficient axial strength thereto, the deepest part of the vessel accordingly being in the middle thereof.

This inner vessel 10 is enclosed in a similar outer vessel or jacket 13 but of greater dimensions so as to form a space 14 between the same and the inner vessel 10. This jacket is also provided with a neck 15, which terminates substantially in the same place as the neck 11 of the inner vessel. This neck 15, however, is conical in order to fit tightly around the upper end of the cylindrical neck 11 of the inner vessel. This neck 11 is preferably flanged and its edges rolled over the upper edge of the neck 15 as seen at 16 to form an airtight joint therewith.

At its lower end the jacket is closed by a separate bottom 17, which is also convex outwardly. This bottom is securely fastened around the lower edge of the side wall of the jacket 13 also forming an airtight joint therewith. This bottom 17 is furnished as a separate member for the purpose of facilitating the assembling of the two vessels. Between the inner bottom 12 and the outer bottom 17 is inserted a cross shaped chair 18 preferably made of band iron or similar material with downwardly bent legs 19 at the outer end of each arm 20. In the center of the chair 18 is provided a block 21 resting on the outer bottom 17. The height of the legs 19 and the block 21 is such as to entirely bridge the distance between the inner and outer bottom, in this manner giving a firm support to the inner vessel upon the bottom of the outer one. Referring particularly to Figs. 1 and 2 it will be seen, that the distance between the legs 19 in diametrical direction is considerably less than the diameter of the inner vessel so that the legs support the vessel about midway between the center and the side thereof.

In the space 14 formed between the sides of the inner and outer vessels, are inserted a number of spacing blocks or brackets 22, four being shown in the drawing near the upper end of the receptacle and four near the bottom thereof spaced 90 degrees apart. It is evident that a different number and different positions of brackets may be used, but they are intended to give a firm support of the inner vessel against the side wall of the outer vessel or the jacket 13.

For the purpose of preventing injury during transportation to the receptacle the jacket is seated with its bottom in a solid foundation or foot 23. This foot has a flat bottom so as to support the receptacle in upright position on the ground and provided with an upwardly projecting annular flange 24 tightly gripping the lower end of the jacket 13 and firmly secured therein so as to form a unit therewith.

The neck of the receptacle is closed by a stopper 25. This consists of a cylindrical portion 26 fitting tightly in the inner neck 11 and a mushroom-shaped head 27 of the same or greater diameter than the flanged portion 16 of the neck so as to completely cover the latter. This stopper 25 is also provided with a hollow chamber 28 and it will thus be seen that the contents of the inner vessel are surrounded on all sides by air thereby delaying the change of their original temperature.

At 29 is shown a pair of handles for lifting and carrying the containers.

In the drawing the can has been shown of cylindrical shape but it is evident, that any other cross section such as square, rectangular or oval may be used. Instead of using flat plate for the receptacle, I may at times select corrugated plate for this purpose.

It should be particularly noticed that this is not a vacuum or thermos bottle but that the space between the inner and outer vessels is filled with air before sealing up the receptacle. This makes the construction cheaper but answers the purpose of preserving the contents of the can at a uniform temperature, so that they will not freeze or be unduly cooled in cold weather, or heated during warm weather, air being a slow heating medium.

According to the use of the can it will be manufactured in larger or smaller sizes so that, for instance the inner vessel would be made to hold five to ten gallons of milk but when constructed for cream the can would be made considerably smaller and to hold about one gallon.

I claim:

A container of the class described comprising an inner vessel having an outwardly convex bottom integral therewith and a reduced neck terminating in a flared mouth, an open bottomed jacket having a body surrounding the inner vessel and having a tapered neck terminating in a flared mouth fitting closely around the flared mouth of the inner vessel, the edge of the mouth of the inner vessel being doubled over the edge of the mouth of the jacket constituting a seal, a convex bottom securely attached to the bottom edge of said body, said body and jacket bottom being uniformly spaced from the corresponding parts of said inner vessel, spacing members secured between the vessel and the jacket, a stopper fitting tightly in the neck of the inner vessel and provided with an enlarged head filling the flared mouth thereof, handles adjacent the neck of the jacket, and a solid foundation having a flange tightly gripping said bottom edge of the body and forming a close fitting seat for said jacket bottom, said foundation having a flat bottom face upon which the container is adapted to stand upright.

In testimony whereof I affix my signature.

BARNEY J. GIESE. [L. S.]